United States Patent
Mittal et al.

(10) Patent No.: US 12,360,759 B2
(45) Date of Patent: Jul. 15, 2025

(54) DOWNGRADING DATABASE SOFTWARE VIA A DOWNGRADABILITY TEST

(71) Applicant: Salesforce, Inc., San Francisco, CA (US)

(72) Inventors: Kaushal Mittal, Mountain House, CA (US); Thomas Fanghaenel, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 106 days.

(21) Appl. No.: 18/313,067

(22) Filed: May 5, 2023

(65) Prior Publication Data

US 2024/0256255 A1     Aug. 1, 2024

Related U.S. Application Data

(60) Provisional application No. 63/482,459, filed on Jan. 31, 2023.

(51) Int. Cl.
*G06F 8/65*        (2018.01)
*G06F 16/21*      (2019.01)

(52) U.S. Cl.
CPC .............. *G06F 8/65* (2013.01); *G06F 16/217* (2019.01)

(58) Field of Classification Search
None
See application file for complete search history.

(56) References Cited

U.S. PATENT DOCUMENTS

| | | |
|---|---|---|
| 10,872,066 B2 | 12/2020 | Martin |
| 10,963,454 B2 | 3/2021 | Fanghaenel |
| 11,061,889 B2 | 7/2021 | Chong |
| 11,151,110 B2 | 10/2021 | Fanghaenel |
| 11,386,065 B2 | 7/2022 | Fanghaenel |
| 11,526,465 B2 | 12/2022 | Shetty |
| 11,537,569 B2 | 12/2022 | Agrawal |
| 11,544,271 B2 | 1/2023 | Helland |
| 11,755,311 B1 * | 9/2023 | Carru ................. G06F 9/44536 717/168 |
| 11,803,373 B1 * | 10/2023 | Carru ........................ G06F 8/71 |

(Continued)

FOREIGN PATENT DOCUMENTS

| | | |
|---|---|---|
| WO | 2020068682 A1 | 4/2020 |
| WO | 2020068855 A1 | 4/2020 |

*Primary Examiner* — Qing Chen
(74) *Attorney, Agent, or Firm* — Kowert, Hood, Munyon, Rankin & Goetzel, P.C.; Catherine L. Gerhardt; Dean M. Munyon

(57) ABSTRACT

Techniques for downgrading of database software. Code areas that may affect downgradability may be delineated with code markers. Changes to these sections can be made to prevent a new database version from being built unless a process is taken to indicate that any new features be designated as available, but not yet allowed for N software releases. This provides a downgrade window of N releases that will support functionality currently allowed by the database. In response to receiving a downgrade request to a target older database software version, that request can be permitted if all the database features are available or allowed in the target version. If at least one of the database features is not available in the target version, the downgrade requested is not permitted. If the request is permitted, the downgrade operation is commenced.

20 Claims, 12 Drawing Sheets

(56) References Cited

U.S. PATENT DOCUMENTS

| | | | | |
|---|---|---|---|---|
| 2007/0074203 A1* | 3/2007 | Curtis | ........................ | G06F 8/65 717/174 |
| 2007/0074204 A1* | 3/2007 | Curtis | ........................ | G06F 8/65 717/174 |
| 2007/0220059 A1* | 9/2007 | Lu | ........................ | G06F 16/2358 |
| 2012/0317562 A1* | 12/2012 | Wang | ........................ | G06F 8/65 717/170 |
| 2013/0103655 A1 | 4/2013 | Fanghaenel | | |
| 2013/0332938 A1 | 12/2013 | Deschler | | |
| 2015/0186128 A1* | 7/2015 | Patton | ........................ | G06F 8/65 717/170 |
| 2015/0261821 A1 | 9/2015 | Mittal | | |
| 2015/0261860 A1 | 9/2015 | Mittal | | |
| 2015/0261862 A1 | 9/2015 | Mittal | | |
| 2016/0092196 A1* | 3/2016 | Kuchibhotla | ............. | G06F 8/65 717/170 |
| 2016/0092197 A1* | 3/2016 | Kuchibhotla | ............. | G06F 8/65 717/170 |
| 2016/0147614 A1 | 5/2016 | Mittal | | |
| 2018/0365277 A1 | 12/2018 | Agarwal | | |
| 2018/0373604 A1* | 12/2018 | Martin | ................ | G06F 11/1451 |
| 2019/0026321 A1* | 1/2019 | Mukhopadhyay | ...... | G06F 16/23 |
| 2019/0034321 A1 | 1/2019 | Martin | | |
| 2019/0163613 A1 | 5/2019 | Martin | | |
| 2020/0097498 A1* | 3/2020 | Tang | ........................ | G06F 16/41 |
| 2020/0159628 A1 | 5/2020 | Martin | | |
| 2020/0201745 A1 | 6/2020 | Martin | | |
| 2021/0073195 A1 | 3/2021 | Agrawal | | |
| 2021/0124568 A1* | 4/2021 | Huang | .................... | G06F 8/65 |
| 2021/0149855 A1* | 5/2021 | Lim | ........................ | G06F 16/284 |
| 2021/0319052 A1 | 10/2021 | Park | | |
| 2022/0067004 A1 | 3/2022 | Agrawal | | |
| 2022/0121766 A1 | 4/2022 | Chong | | |
| 2022/0129428 A1 | 4/2022 | Agrawal | | |
| 2022/0129433 A1 | 4/2022 | Agrawal | | |
| 2022/0138175 A1 | 5/2022 | Mahendra Kumar | | |
| 2022/0188317 A1 | 6/2022 | Fanghaenel | | |
| 2022/0245113 A1 | 8/2022 | Agrawal | | |
| 2023/0060733 A1 | 3/2023 | Arora | | |

\* cited by examiner

314⟶

| Target | Version | Feature | Set | Listing | Downgradable? |
|---|---|---|---|---|---|
| a | b | c | d | e | |
| Not Present | Not Present | Not Present | Not Present | Not Present | No |
| Allowed | Allowed | Allowed | Available | Not Present | No |
| Available | Available | Available | Available | Available | Yes |
| Allowed | Available | Available | Available | Available | Yes |
| Allowed | Allowed | Allowed | Allowed | Allowed | Yes |

324⟶ Current Features in Database : a, b, c, d, e 420A, 420B, 420C, 420D, 420E

Receiving a request to downgrade from a current version of database software to an older, target version of database software, the database software being executable to interface with a database

670

Performing a downgradability test that determines whether the target version of the database software is compatible with a current state of the database, where the performing includes 1) determining a first set of features that have been allowed for the database, 2) determining a second set of features that are indicated as available or allowed in the target version of the database, and 3) determining whether the target version of the database software is compatible with a current state of the database by assessing whether all of the first set of features are included in the second set of features

680

Responding to the request based on a result of the downgradability test

FIG. 6B

DOWNGRADING DATABASE SOFTWARE VIA A DOWNGRADABILITY TEST

CROSS-REFERENCE TO RELATED APPLICATIONS

The present application claims priority to U.S. Provisional Application No. 63/482,459, entitled "DOWNGRADING DATABASE SOFTWARE," filed Jan. 31, 2023, the disclosure of which is incorporated by reference herein in its entirety.

BACKGROUND

Technical Field

This disclosure relates generally to deployment of computer software, and more specifically to deployment of database software in a manner that permits the reliable downgrading of such software.

Description of the Related Art

Computer software products, particularly enterprise software products, are commonly upgraded on a regular basis. Upgrades occur for a variety of reasons, such as to address bug fixes, or add new functionality. Some software products being upgraded are "stateless," meaning that they do not maintain any state (e.g., variables) within the services across calls. Such products (e.g., microservices) take in a request, process it, and send a response back without maintaining any state information. On the other hand, some software products such as database software have a persistent state (e.g., a system catalog, a persistent data store, log records, etc.). The latter can thus be more difficult than the former to change.

Historically, software code updates were released at lengthy intervals. But now, releases for software applications occur at a much more rapid pace. At the core of modern software development are a set of practices often referred to as the "CI/CD pipeline." CI/CD is a paradigm for speeding up software releases by introducing automation into the software development cycle. CI/CD concepts include continuous integration, continuous delivery, and continuous deployment. Thus, the trend in software development is to integrate new code functionality into production as quickly as possible.

BRIEF DESCRIPTION OF THE DRAWINGS

FIG. 4B illustrates several examples of results of a downgradability test.

FIG. 6B is a flow diagram of one embodiment for a method for evaluating a downgradability request for database software.

DETAILED DESCRIPTION

Figure 1:
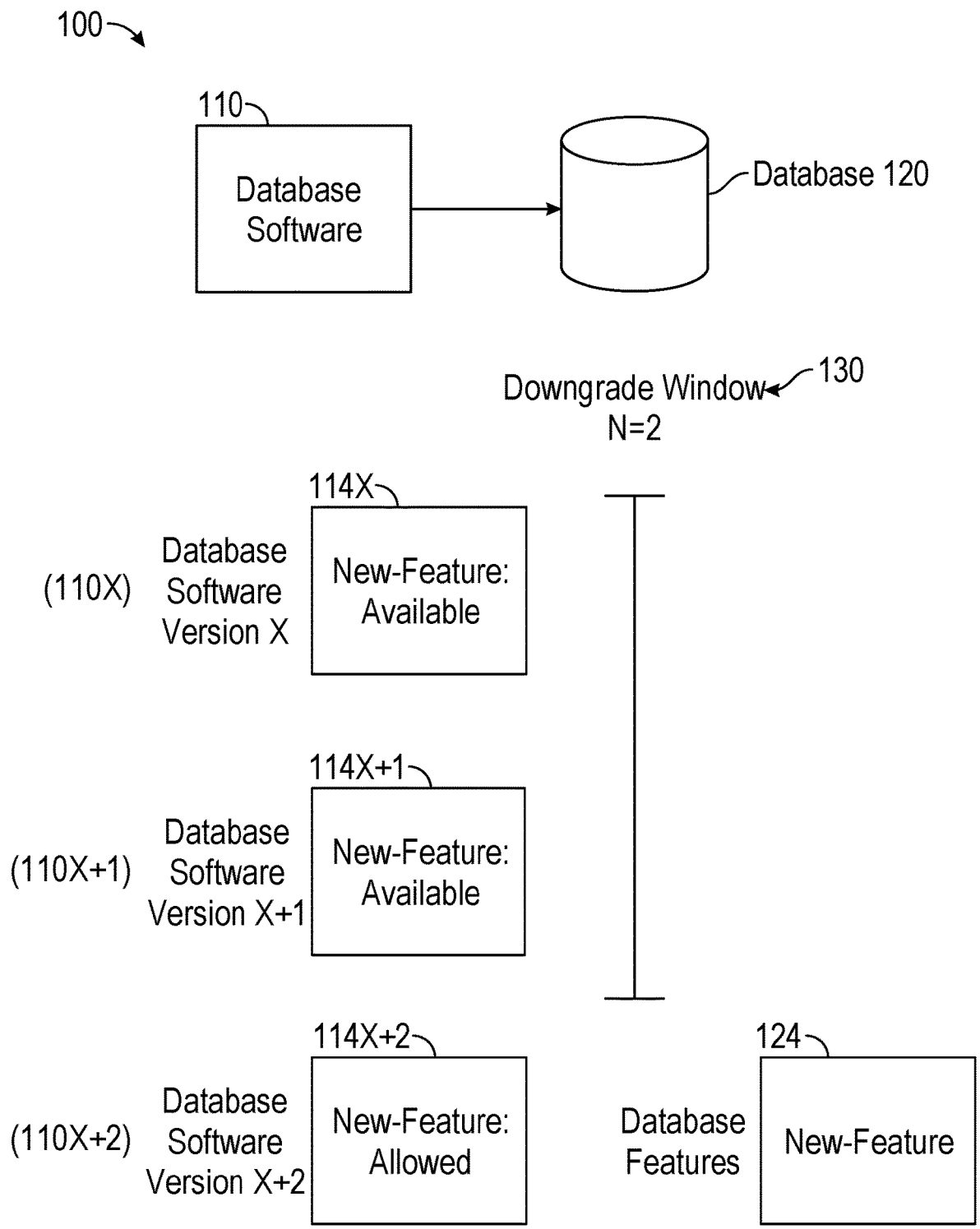
FIG. 1 is an example that illustrates a downgrade-safe software deployment paradigm.

Given today's emphasis on CI/CD principles, there is a need to move to a rapid-release model even for complex, persistent-state products such as databases. Ideally, database software could be released at a frequent cadence, such as every week. Such a release would be subject to staggered testing before getting deployed in production. Any issues ("regressions") found during such testing would be able to be fixed and delivered with the next weekly release. In this manner, features can thus be delivered extremely quickly after they are ready.

This paradigm, however, poses a greater risk of running into regressions since changes are delivered directly from the master. Currently, when a regression is encountered, an emergency release is used to fix the regression if there is not a global configuration setting that allows easy disabling of the change that is causing the regression. When such a setting is not available, error resolution protocols provide for first assessing a root cause for the failure, followed by finding a way to mitigate the issue, testing it, and then releasing the patch. This process is very time-consuming.

For upgrades, state changes are relatively easy to manage by making such changes in a backward-compatible way. Versioning database data structures enables code to read both the older and newer formats of these data structures. In this manner, upon a transition to a newer version of the software, code that reads these data structures can correctly interpret the read results based on their version.

Database software rollback for stateful applications is more complicated. If an error is encountered, and there is a need to roll back from the current release of the software to an older release, the older release of the software will not, for example, have the ability to read new or modified versions of data structures found in the current release. As an example, consider a change in the row record format for a database that exists in a particular release (e.g., 242.13). The persistent storage for the database will now be written by the particular release to have the new row record format. If the current version of the database software is subsequently rolled back to 242.12, that older version does not have the capability to read the new format of the row record because release 242.12 has no knowledge about the record format change implemented in release 242.13.

The inventors have thus recognized the need for a way to roll back database software to an older but stable release version. To accomplish this, the inventors have developed a database software deployment paradigm. When new functionality is to be introduced into database software, it is included in the code, while not actually being used for N releases. (N is an integer greater than or equal to one.) This approach provides a "downgrade window" of N releases to downgrade to in the event that a downgrade is needed. As will be described, each of these N downgrade options includes code that, while not yet used, is able to handle the new functionality. This approach addresses the need for more rapid database software release cycles while providing forward-compatibility for new functionality.

Downgrade-Compatible Software Deployment

FIG. 1 depicts this approach via an example 100. As shown, database software 110 is executable to interface with a database 120. As used herein, "database software" refers to the database engine that provides database services, such as data storage, data retrieval, and data manipulation of data stored in a database, which is a separate entity from the database software. In some cases, database software 110 can write data to a local software cache, which may be periodically flushed to persistent storage of database 120. Three versions of database software 110 are depicted: version X (denoted by reference numeral 110X); version X+1 (110X+1); and version X+2 (110X+2).

In the same manner that software upgrades require backward compatibility, the inventors have recognized that software downgrades can be made to require forward compatibility. The inventors have thus proposed a new process to roll out databases software changes having a downgrade impact in such a way that forward compatibility with N past releases is maintained, where N is the downgrade window. The features/changes with downgrade impact will be rolled out in a staggered manner to ensure that there are N releases that can work with that feature enabled, before allowing that feature to actually be used to affect the persistent state of the database. With this process, if an issue is encountered during any software release, the database software can safely fall back to any of the past N releases, because all of those releases are forward compatible with the current release.

FIG. 1 illustrates this approach with respect to new functionality to be introduced into database software version 110X, denoted as "new-feature." Accompanying version 110X is a feature set 114X, which denotes the status of all features included in version 110X. The relevant portion of feature set 114X for example 100 indicates that new feature has the status "available." As used herein, "available," when used with respect to a database feature, is a status indicating that the feature is ready for use, is included in the database software, but is not yet enabled. In some cases, prior to being listed as being "available" in feature set 114X, new-feature might have been marked as being in development (e.g., with the label "dev").

In the next release of database software 110 (version 110X+1), new-feature is still indicated as available in feature set 114X+1. Note that an indication of what features are found in a particular feature set can be stored in one place (e.g., a single file storing feature sets for all versions of database software 110) or multiple places (e.g., one file per version of database software 110).

Example 100 defines a downgrade window 130, in which the downgrade window N, is 2. This means that when new-feature is introduced into database software 110, there will be two releases in which new-feature is available (i.e., versions 110X and 110X+1). In successive releases (i.e., beginning with a third release such as version 110X+2), new-feature is now given a status of "allowed" in feature set 114X+2.

When a database software feature is indicated as "allowed," this means that code previously included but not enabled in the prior N releases, is now enabled. This means that use of this feature by the new release can change database 120 itself. For example, new-feature might change the format of a database object, such as by adding a column to a database table. Accordingly, when a feature becomes "allowed," it is now included in the feature set 124 of database 120. Previously, new-feature was not included in feature set 124 when it was merely an "available" feature in database software 110.

In various embodiments, once a feature becomes part of the feature set of the database, that feature is to be supported going forward, both by upgrades and downgrades to the database software. Stated another way, in such embodiments, once a feature is allowed, a downgrade is not permitted to a database software version in which code that implements that feature is not present. The paradigm depicted in FIG. 1 accomplishes this objective. Suppose database software version 110X+2 is discovered to have a bug. At this point, new-feature is now part of feature set 124 of database 120 and needs to be supported even though a downgrade is indicated. A downgrade will be possible to versions 110X and 110X+1, because the code to implement new feature was previously included in those versions. When a downgrade is performed to one of those versions, the code to implement new feature, previously disabled when those versions were originally released, can now be enabled to provide continuity with the inclusion of new feature in the state of database 120.

Identifying Software Changes with Downgrade Impact

Upstream from the paradigm discussed in FIG. 1 is the need to identify those changes that can lead to downgrade compatibility issues—that is, those changes that have a "downgrade impact." Not every change to database software 110 will have a downgrade impact. For example, consider a scenario in which database software 110 writes to database 120 via a software cache (which may be organized as a log-structured merge (LSM) tree in some embodiments). A change to software 110 that alters how the LSM tree is managed will not have a downgrade impact because that change does not change the features of the database. Similarly, a change that improves read or write efficiency also does not affect the features of the database and thus does not have a downgrade impact. In contrast, those changes that do affect the database itself (such as schema changes) are categorized as having a downgrade impact. In general, changes in persistent data structures such as row record format, log record format, or changes in schema definition of system tables, etc. are changes that have downgrade impact. On the other hand, changes that are not directed to persistence or external interfaces, including, but not limited to, performance optimizations and updates to in-memory data structures, do not have a downgrade impact.

The responsibility for identifying downgrade-sensitive code ultimately lies with the developers. In many cases, enterprise database software can be quite complex, with different portions of the code being maintained by different development teams. Thus, the responsibility of identifying downgrade-sensitive code can be distributed to members of each of these teams, as team members are most knowledgeable about the content of the particular code sections that they maintain.

Figure 2:
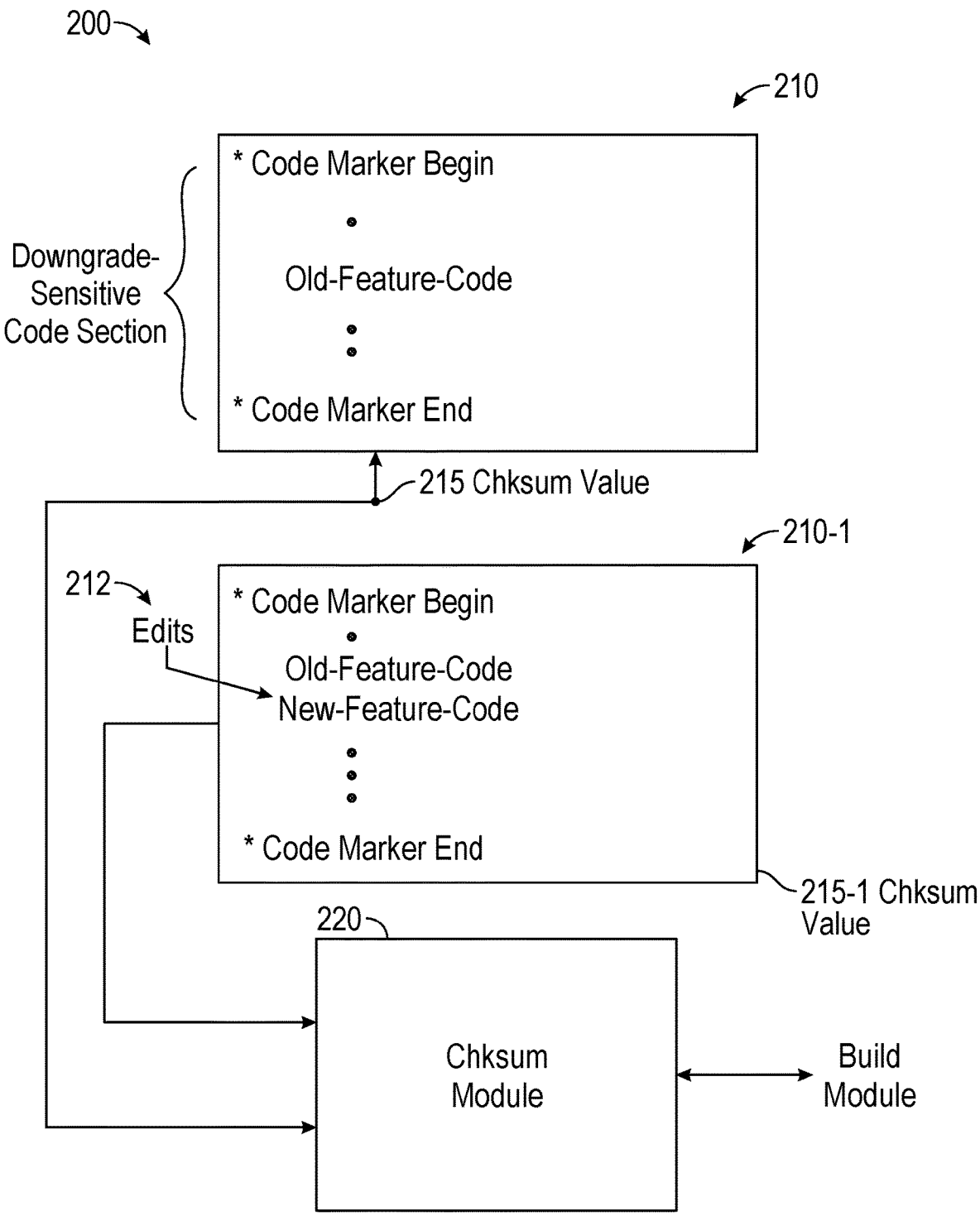
FIG. 2 is an example illustrating the use of code markers to help identify downgrade-sensitive code sections.

Once these code areas are identified, one approach is simply to also rely on individual developers to update feature set 114 to indicate that new code features are allowed. Another approach with a stronger enforcement mechanism is illustrated in FIG. 2. Example 200 depicts a portion of code 210, which has been identified as a downgrade-sensitive part of database software 120. Code portion 210 has thus been delimited by code markers. Code portion 210 could correspond, for example, to the version field of the storage catalog for database 120. Changes to the format or information stored in the storage catalog result in a change in storage catalog version, making the version field a place where code markers are appropriate. If a change is made in the storage catalog format, the version field will change.

Code portion 210 also has a checksum value 215 that has been computed for the content of code within these markers (which includes an existing feature labeled as "old-feature-code"). Checksum (chksum) value 215 is usable to determine whether any edits have been made to the code between the beginning and ending code markers in code portion 210.

Now suppose that edits 212 have been made to code portion 210. This is shown in FIG. 2 by the inclusion of "new-feature-code" to code portion 210, which is now given the reference numeral 210-1 to indicate the change. These edits will result in a new checksum value for code portion 210-1, which is indicated as checksum value 215-1. As shown a checksum (checksum) module 220 can then be used to determine, in the context of a request from a build module (described below with respect to FIGS. 3A-C) whether a change has been made to code portion 210. In one embodiment, checksum module 220 can receive checksum value 215 and receive code portion 210-1. Module 220 can then compute checksum value 215-1 from code portion 210-1, and then indicate to the build module if a change is detected. The process of releasing successive versions of the modified code is described next.

Transition from Available to Allowed Status

Figure 3A:
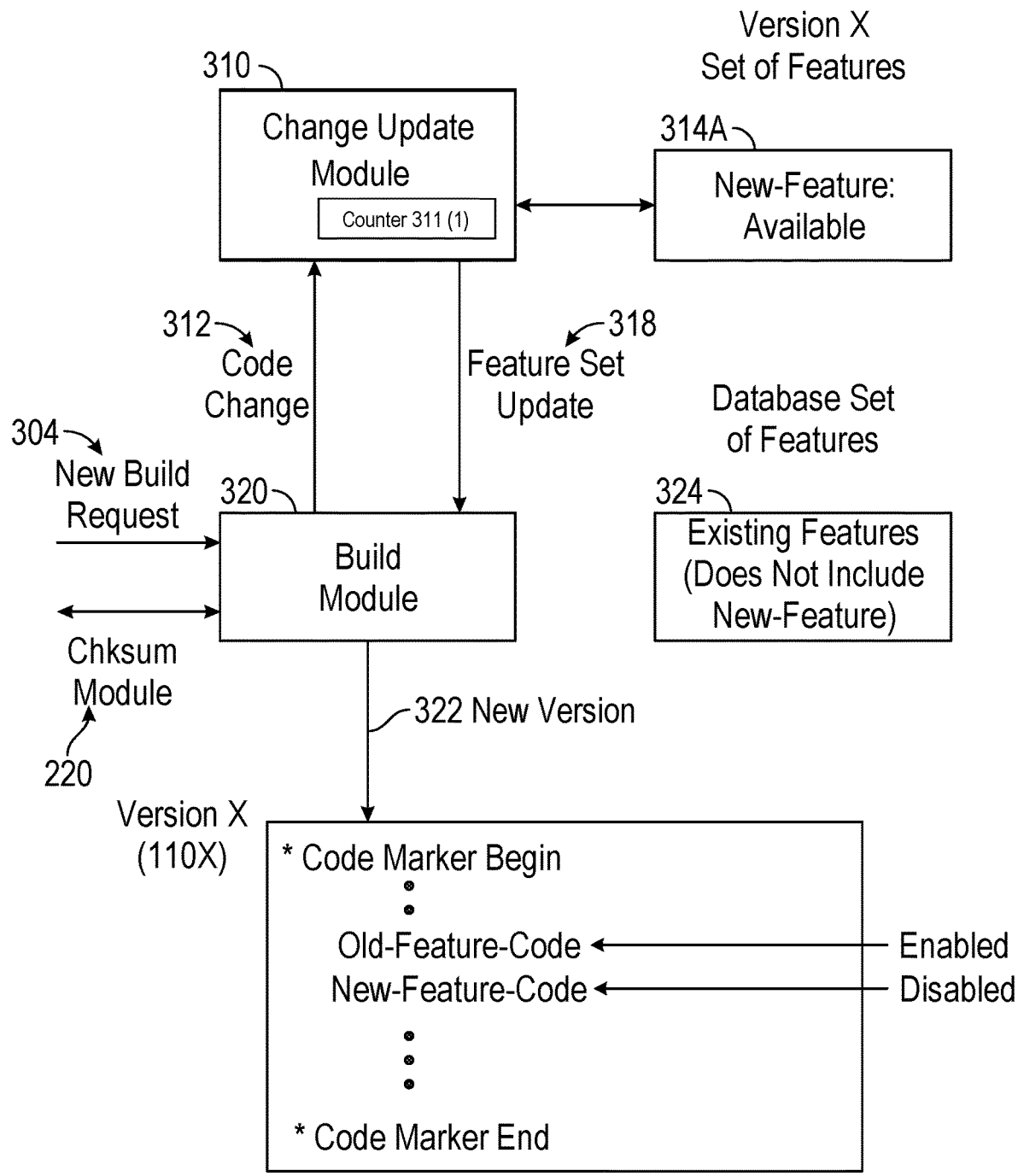
FIGS. 3A-C illustrate an example of how a new feature of database software can progress from available to allowed status.
Figure 3B:
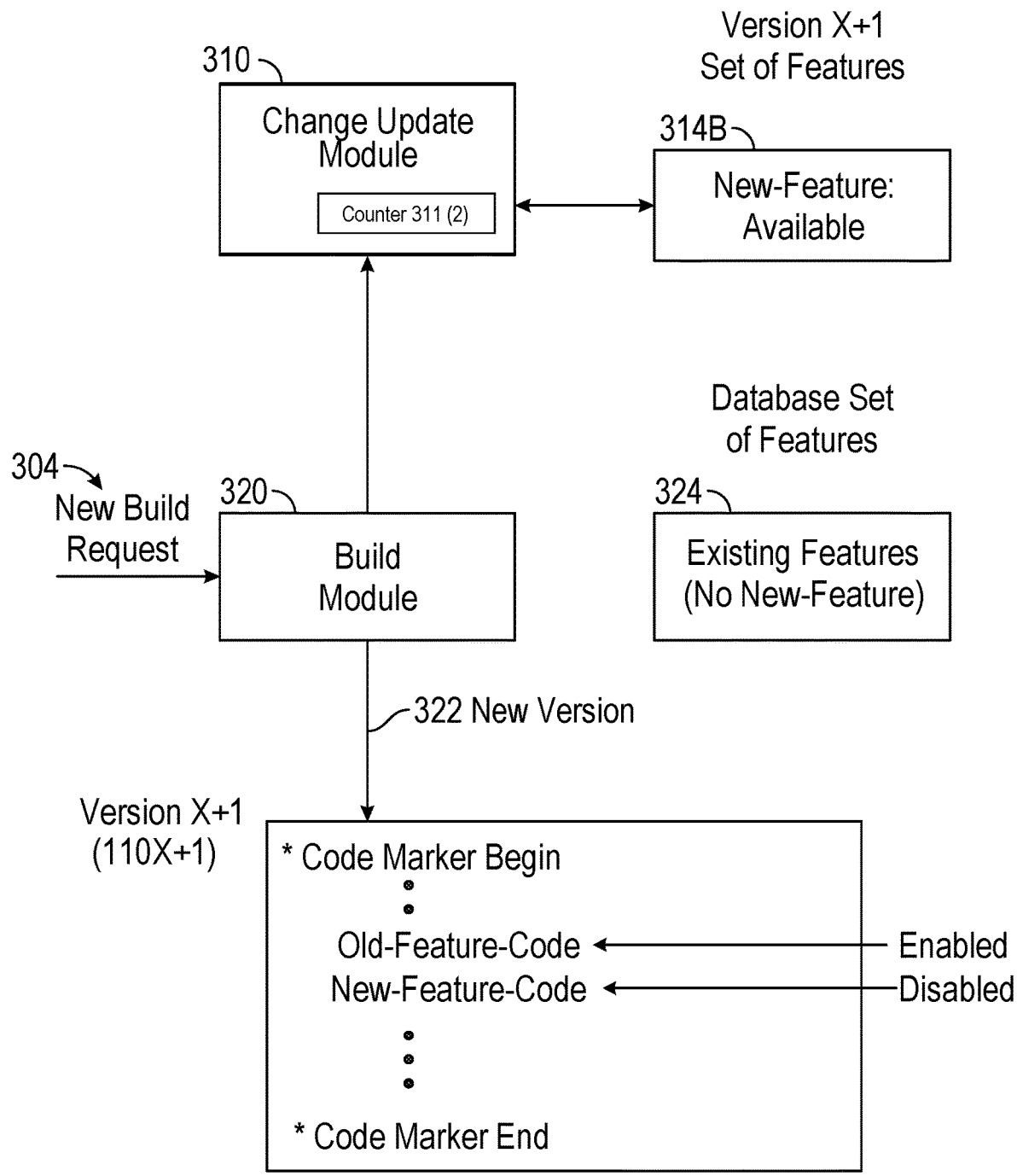
Figure 3C:
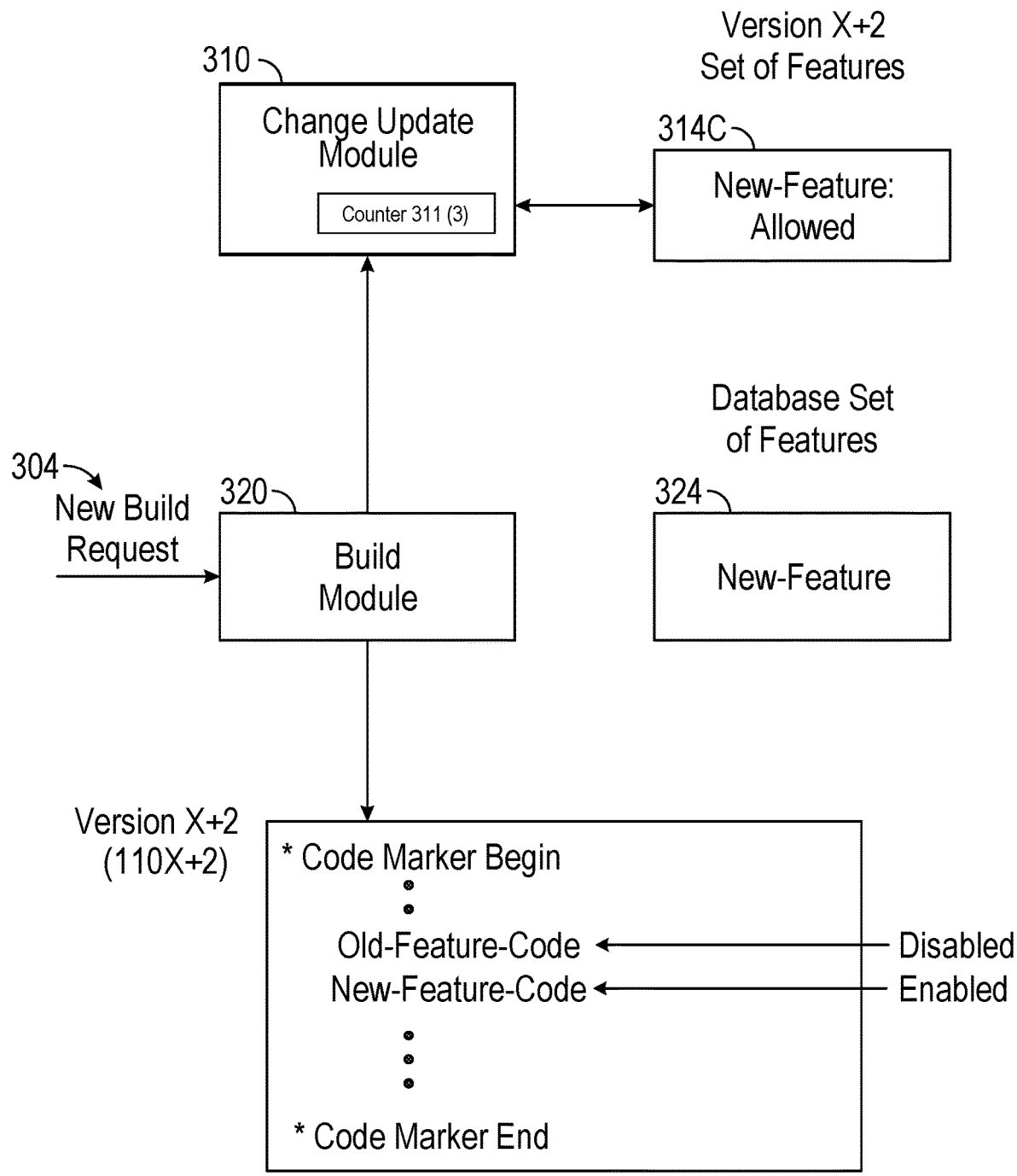

FIGS. 3A-C illustrate successive builds of database software, along with the corresponding changes in feature sets 314 (for database software 110) and 324 (for database 120), following the edits described with respect to FIG. 2.

FIG. 3A is a block diagram of one embodiment of a software deployment system. As shown, build module 320 receives new build request 304, which, in one implementation, is a request to create a binary for a new release of database software 110, specifically version 110X that includes edits 212 described with respect to FIG. 2. As part of this build process, module 320 will attempt to compile various code portions, including portion 210. When module 320 encounters the code markers in code portion 210, it can call chksum module 220 to determine if there is a code change. If no change is detected, module 320 can continue with the build process.

But if a code change is detected, module 220 can send a corresponding indication to build module 320. Module 320, in turn, can send code change signal 312 to change update module 310. The purpose of change update module 310 is to enforce the updating of feature set 314A (the set of features in database software 110) before the build process can continue. That is, when change update module 310 receives code change 312, module 310 can begin a process that ensures that feature set 314A is updated to include "new-feature," along with a corresponding status of "available." This process can include displaying an error message during the build process that indicates the need for the update. In some cases, the build process might open an editing tool for the file that corresponds to feature set 314A. Upon edits to the file (which could be checked to ensure that the feature status for new-feature is a "available"), change update module 310 can signal to build module 310 (via feature set update 318) that feature set 314A has been appropriately updated, allowing the build process to proceed to produce new version 322 of database software 110, which in this instance corresponds to version 110X. Change update module 310 may also maintain a counter 311 for new-feature. As depicted in FIG. 3A, counter 311 is set to 1 to indicate that version 110X is the first version of database software 110 to include new-feature.

Version 110X, as shown, includes both new-feature-code and code for the prior version of new-feature, "old-feature-code." For example, old-feature-code, when executed, might access a version of a database table that has three columns: A, B, and C. The new-feature-code version, on the other hand, might, when executed, access an updated version of the same database table that also includes a column D. Version 110X includes code that is executable to access both versions of the database table. As shown, the old-feature-code section is enabled as the default behavior of this code portion, while the new-feature-code section is disabled. This new release thus does not actually implement the functionality of new-feature. Accordingly, new-feature is not yet considered to be part of feature set 324. Accordingly, FIG. 3A indicates that while feature set 314A includes new-feature as "available," database feature set 324 does not yet include new-feature-code. Feature set 324 does, however, include various other existing features. As will be seen, the inclusion of new-feature-code, although currently disabled, will provide the basis for downgradability at a later point in time.

FIG. 3B illustrates the build and release of the next version of database software 110, denoted as version 110X+1. Again, build module 320 receives new build request 304, and commences the build process. In this iteration, there is no detection of further changes to code portion 210 (although there may be other changes to other code portions, not pictured). Build module 320 may, however, communicate new build request 304 to change update module 310, which may maintain state for each additional feature being introduced into database software 110. Here, change update module 310 might store information such as an update to counter 311 indicating that the new version being requested is the second version of software 110 that includes new-feature-code (thus, counter 311 is now set to 2). Similar information may be maintained for other features. The downgrade window is once again equal to two in this example. Accordingly, new-feature remains in the available state in feature set 314B, but is still not included in database feature set 324.

Accordingly, new version 322 is produced (in this case, version 110X+1). Once again, old-feature-code is enabled as the default behavior of version 110X+1, while new-feature-code is disabled.

FIG. 3C illustrates the build and release of the next version of database software 110, denoted as version 110X+2. Again, build module 320 receives new build request 304, and commences the build process. In this iteration, there is again no detection of further changes to code portion 210 (although there may be other changes to other code portions, not pictured). Build module 320 again communicates new build request 304 to change update module 310, which recognizes (e.g., based on the fat that counter 311 is now equal to 3) that this is the third version of software 110 that includes new-feature-code. Since the downgrade window is two, it is now appropriate for new-feature to graduate from a status of available to allowed. As such, feature set 314C is updated. Additionally, database feature set 324 is also updated to include new-feature. This change means that all future releases of database software 110 that are released to production will need to support new-feature.

As shown, build module 320 produces new version 322, which in this case is version 110X+2. Now that new-feature is in the allowed state, new-feature-code is now enabled as the default behavior for code portion 210, while old-feature-code is disabled.

FIGS. 3A-C illustrate a scenario in which new-feature graduates from available to allowed status. In some cases, testing that is performed after the introduction of version 110X but before the introduction of version 110X+2 may uncover a problem with new-feature-code. In such situations, new-feature-code may be revised or even removed before it becomes part of feature set 324.

Downgrade Requests

Suppose, however, that the introduction of version 110X+2 introduces a bug into database software 110 that is unrelated to new-feature-code. For example, the bug might be related to read/write performance or managing the database cache. In such an instance, it becomes desirable to be able to downgrade database software 110 to a prior version.

Figure 4A:
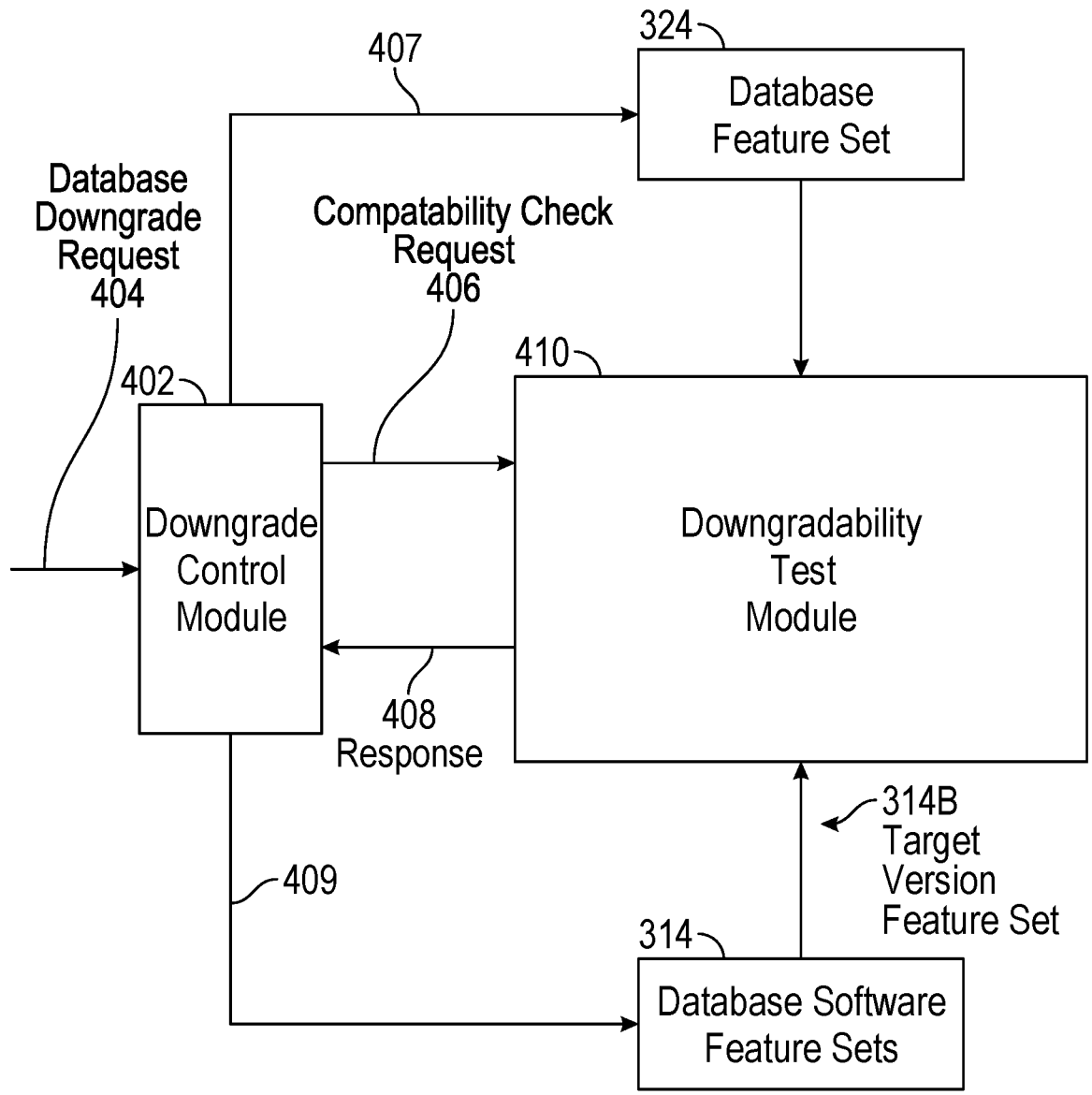
FIG. 4A is a block diagram of one embodiment of modules for assessing whether a requested downgrade should be permitted.

FIG. 4A illustrates a block diagram of one embodiment of various modules for initiating a downgrade of database software. As shown, downgrade control module 402 receives database downgrade request 404, which includes, in one embodiment, the version number or other indication of the (older) database version to which the downgrade is requested. Module 402 then passes a compatibility check request 406 to downgradability test module 410.

Downgradability test module 410 is executable to assess whether a requested downgrade should be permitted. In order to ensure that module 410 has the information needed to make this determination, downgrade control module 402 makes an access 407 to database feature set 324 in one embodiment, which causes this information to be available to test module 410. As has been noted, feature set 324 is the current set of features of database 120—these features must be supported by the target version. Control module 409 also makes an access 409 that includes the target version. This information is used to access a data store that includes the feature sets 314 for all the different versions of database software 110. In this example, the target version is 110X+1; accordingly, feature set 314B is selected and is thus available to test module 410.

Module 410 then proceeds to compare feature sets 324 and 314B. Feature set 314B, as has been described, includes those features that are indicated either as "available" or "allowed" in the target database software version 110X+1. In general, the available features will be the more recent features (introduced in the last N releases, where N is the downgrade window), while the allowed features are typically those that are more long-standing (introduced prior to the last N releases). If all features present in database feature set 324 are indicated as available or allowed in set 314B, then compatibility check request 404 passes, and is so indicated via response 408.

If, on the other hand, one or more of the features of set 324 are not available or allowed in set 314B (i.e., the one or more features are "not found" in set 314B), the downgrade is not permitted, and this is so indicated in response 408. To permit a downgrade in this circumstance would be to transition to a version of database software 110 that is incompatible with database 120 in some fashion. For example, after database 120 has been modified to include a version of data structure ds that includes int a and int b, a downgrade should not be permitted to a version of the database software whose default behavior is to access an old version of data structure ds that includes int a but not int b.

The test performed by module is thus concerned with quantities in two dimensions. The first dimension, the capabilities of the database software 110 binary, is captured by a particular database software feature set 314. The second dimension, on the other hand, is captured by database feature set 324.

Several examples of results a downgradability test that can be performed by module 410 are shown in FIG. 4B. For the sake of simplicity, a sample database feature set is shown as having five features: a, b, c, d, and e. In practice, an enterprise database will have many more such features. Also shown is the status of feature set 314 for the target version of database software (e.g., version 110X+1) relative to features a-e.

Rows 420A-B illustrate scenarios where the downgrade request is not approved. In the scenario corresponding to 420A, none of features a-e are present in the target version. In the scenario corresponding to row 420B, features a-d are present because they are "allowed," but feature e is not. (Feature e might correspond to new-feature described above, where the target version of database software 110 is a version prior to version 110X.) For both rows 420A-B, the target version is not a viable candidate for the downgrade; response 408 thus indicates that request 404 is denied. Rows 420C-E, on the other hand, all correspond to scenarios in which request 404 is approved. In these scenarios, features a-e are either all available (row 420C), all allowed (row 420E), or a combination of available and allowed (row 420D).

In short, downgrading to a target release version of database software 110 is permitted if and only if all of the current features of the database are either available or allowed in the target release version. This process thus permits assessing, deterministically, whether it is safe to rollback to an older version. This process also prevents ending up at an incompatible release via multiple downgrades.

Downgrade Operation

Figure 5A:
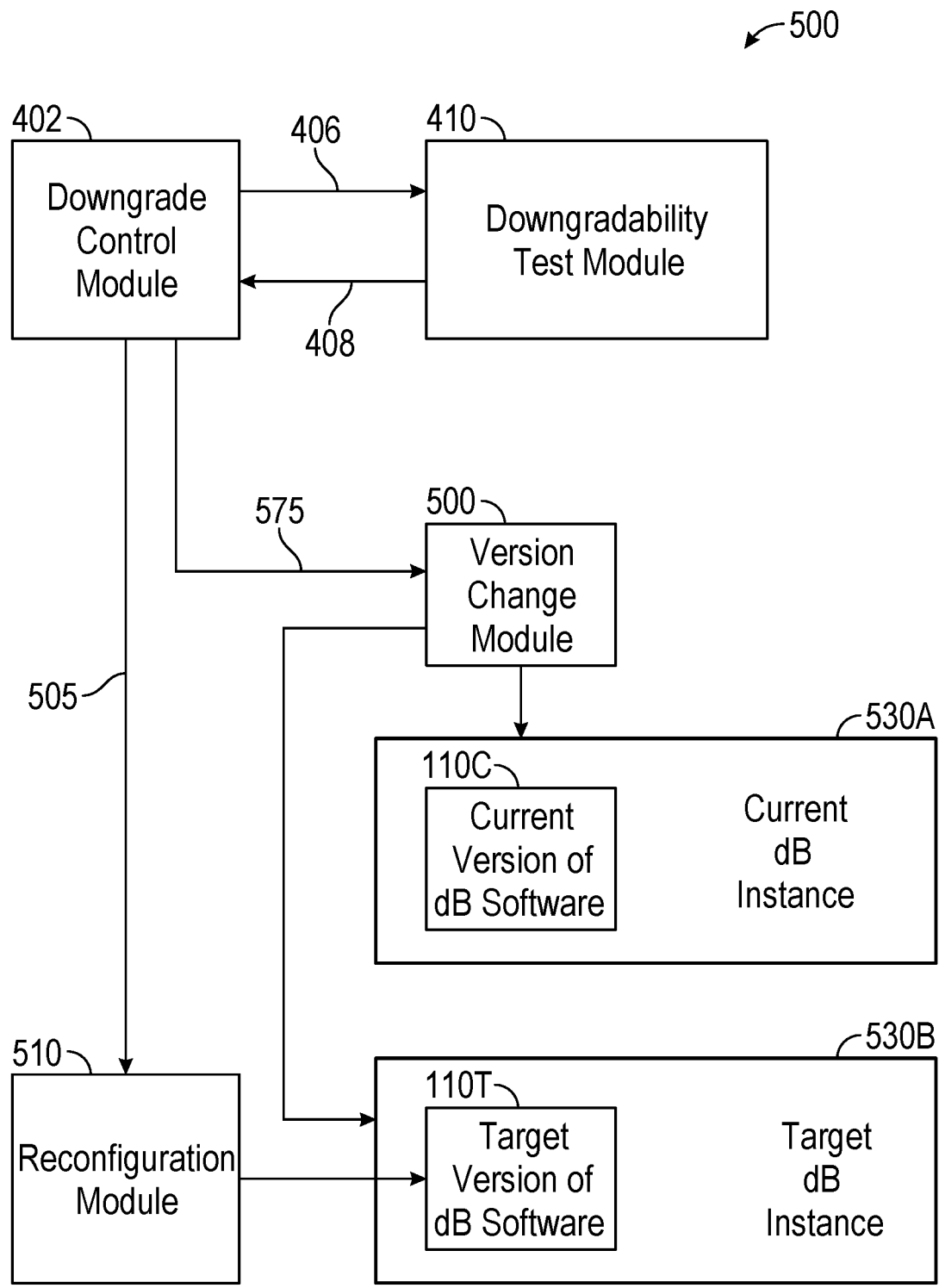
FIG. 5A is a block diagram of one embodiment of modules that perform various aspects of a database software downgrade process.

Once the downgradability test has been passed, the downgrade process can be initiated. FIG. 5A is a block diagram 500 illustrating various modules that might be utilized in one embodiment of this process. As shown, diagram includes downgrade control module 402, downgradability test module 410, reconfiguration module 510, version change module 520, current database instance 530A, and target database instance 530B.

The operation of downgrade control module 402 and downgradability test module 410 have already been described with respect to FIG. 4A. Test module 410 determines, in response to compatibility check request 406, whether a downgrade to a specified target version of database software 110 is permissible. Response 408 indicates the result of this check.

If a downgrade is permitted, control module 402 initiates several processes via indications 505 and 515 (which may be function calls in one embodiment). Indication 505 causes reconfiguration module 510 to prepare a target database instance 530B for use in the downgraded database instance, as will be described with respect to FIG. 5B. Indication 515, on the hand, causes version change module 520 to perform the version change operation from a current database instance 530A, which is running a current version of database software 110 (denoted as version 110C for "current"), to the target database instance 530, which will run a target version of database software 110 (denoted as version 110T for "target"). This process will be described in FIG. 5C.

Figure 5B:
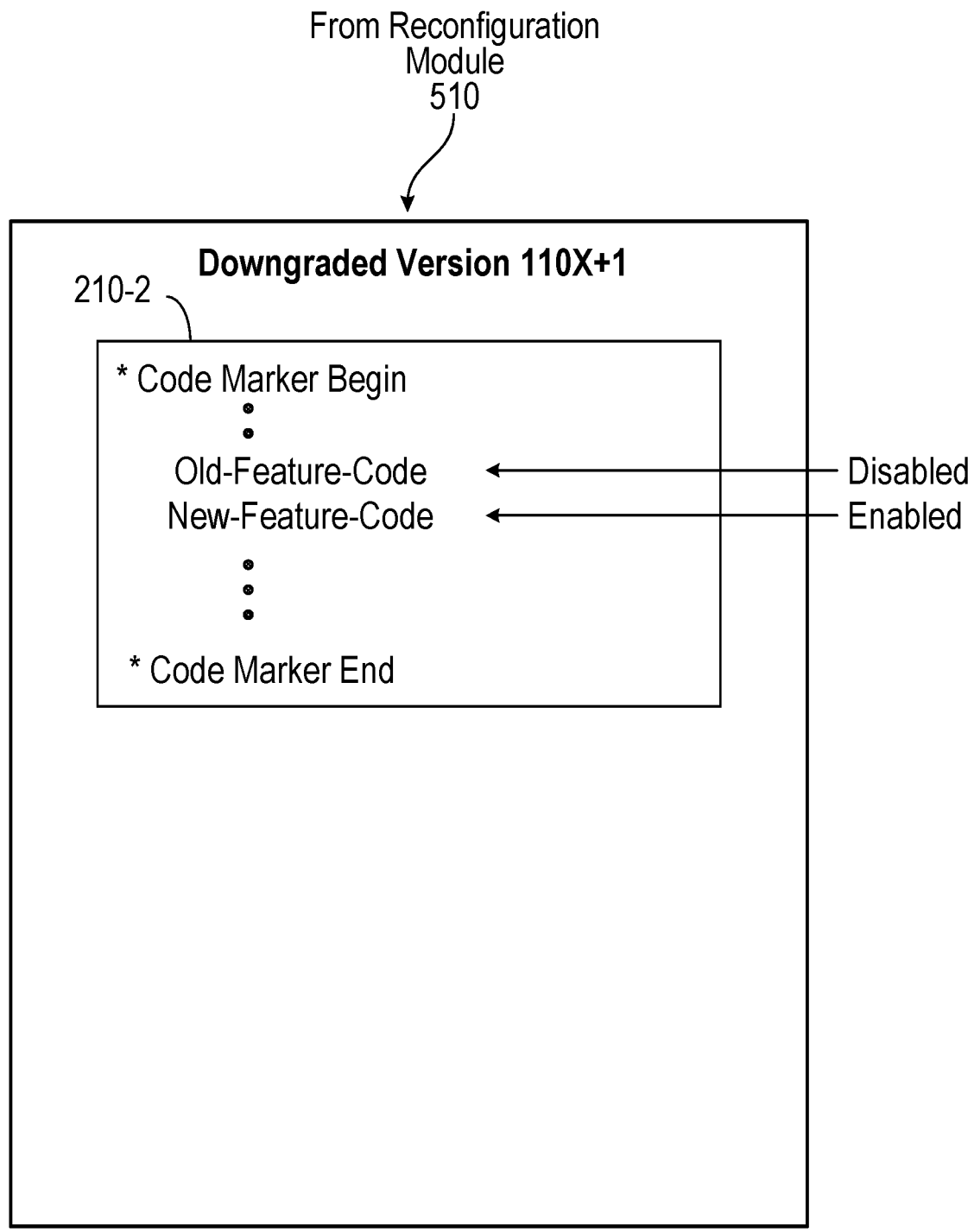
FIG. 5B illustrates database software that has been reconfigured to run after a downgrade request.

Before the current database instance is officially rolled back, some reconfiguration of the target version of database software 110 may be needed. FIG. 5B illustrates an example of a reconfiguration of version 110X+1 of the database software. When version 110X+1 was first released, old-feature-code was the default behavior, and new-feature-code was disabled (see the discussion accompanying FIG. 3B). But since new-feature-code has now become a property of database 120, the default behavior of code portion 210-2 is changed relative to code portion 210-1, such that it now points to new-feature-code rather than old-feature. This result is shown in FIG. 5B. In some cases, the default behavior of version 110X+1 might be able to be changed without recompilation. For example, code portion 210-1 might be structured as follows:

```
if (FeatureIsAllowed(new-feature)
    new-feature-code
else
    old-feature-code.
```

Under this code organization, if new-feature is not allowed, old-feature-code will be executed. Conversely, if new-feature is allowed, new-feature-code will be executed. In this manner, no reconfiguration is required. Because target version 110X+1 has new-feature as "available" and the database feature set 124 has new-feature as "allowed," FeatureIsAllowed (new-feature) will return "true," and thus enable the new-feature-code path. In contrast, the function call FeatureIsAllowed (new-feature) in target version 110X+1 previously would have determined that new-feature was "available" but not "allowed" in database feature set 124. Accordingly, the function call would return "false," enabling the old-feature-code path. In short, when downgrading from version 110X+2 to 110X+1, the binary indicates that new-feature is available and the database feature set indicates that new-feature is allowed. In this circumstance, FeatureIsAllowed (new-feature) returns "true," and thus continues to keep new-feature-code path enabled, even after downgrading.

Figure 5C:
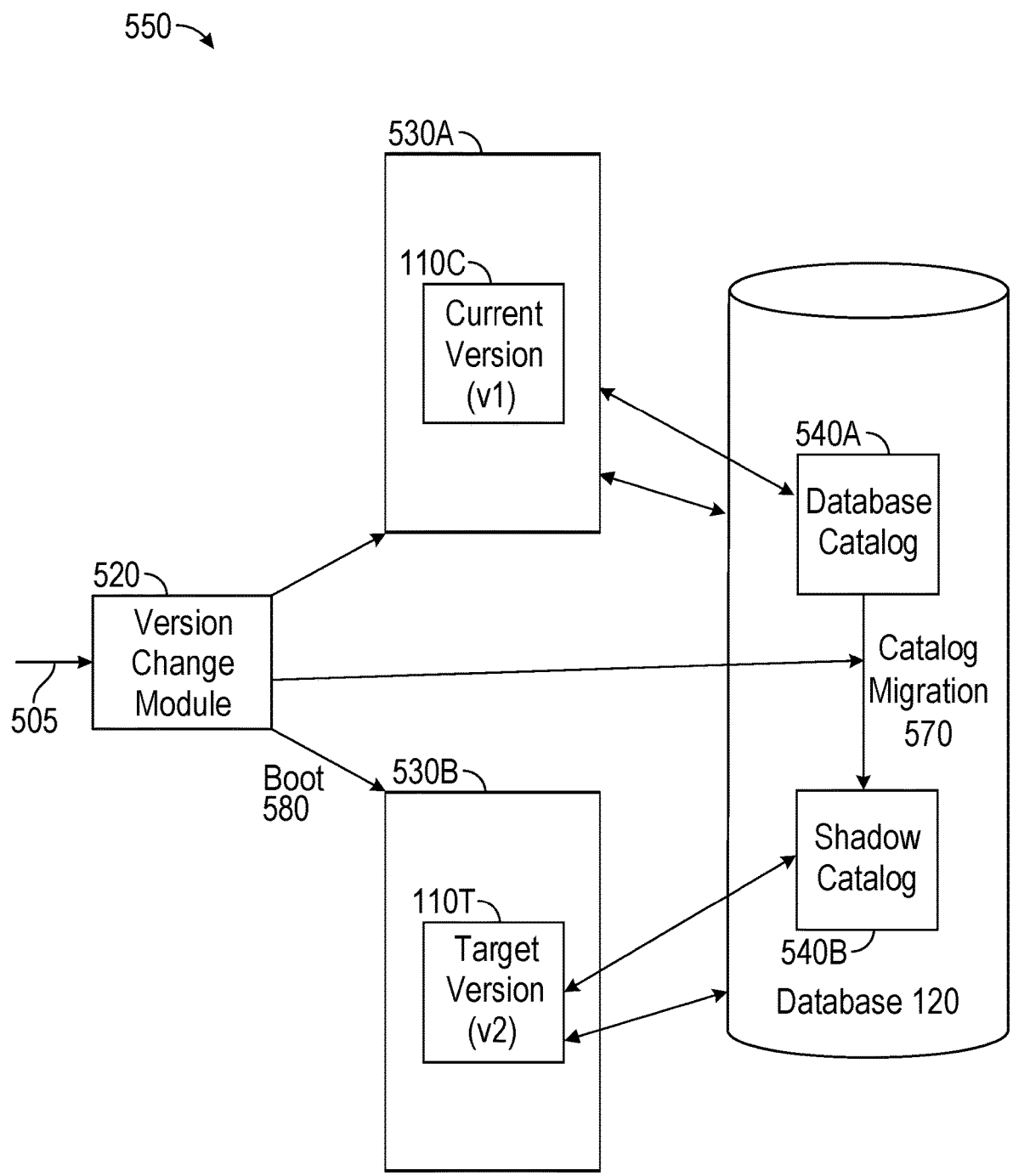
FIG. 5C is a block diagram of one embodiment of a version change module that performs a database software downgrade.

FIG. 5C is a block diagram of one embodiment of modules that are executable to change the currently executing version of database software 110. Block diagram 550 includes version change module 520 which, in response to receiving indication 505, is executable to interact with current database instance 530A and target database instance 530B. As shown, current instance 530A includes current version v1 (reference numeral 110C), current system catalog 540A, and database 120.

Version change module 520 can begin the downgrade process with a boot command 580, which spins up a new database instance 530B, which is running database version v2 (reference numeral) 110T. Database instance 530B, in one embodiment, is accessing the same database 120, but only in a read-only mode. Module 520 can also cause catalog migration command 570, in which the current contents of system catalog 540A are copied into a "shadow" catalog 540B. As is understood in the art, a database catalog includes metadata, such as how a database instance interprets data stored in the database. This metadata may include definitions of database objects, indexes, users, user groups, and the like. As part of catalog migration 120, shadow catalog 540B is updated to reflect feature changes in database software 110T in database instance 530B relative to database software 110C in database instance 530A. Accordingly, database software 110C and 110T will now interpret data in database 120 differently based on different catalogs 540A and 540B.

At this point, according to one embodiment, database instances 530A and 530B are both running, but interpreting database 120 using different catalogs 540. Instance 530A may be in a read/write mode, while instance 530B is in a read-only mode, replaying the transaction logs to keep in sync with instance 530A. Version change module 520 then can send a command to the servers hosting instance 530A indicating that they are no longer allowed to write database 120; these servers are then taken down. One of the servers hosting instance 530B then receives a notification that it should take over writes, and promotes itself to be a "writer." This is a "failover" process that is faster than stopping the servers of instance 530A and then starting the servers for instance 530B (although that is a possibility in other embodiments). Once instance 530B is running in read/write module, other modules (such as a load balancer, not pictured) can cause database requests to begin being serviced by instance 530B rather than 530A, thus completing the rollback.

For many databases, complex code is executed upon upgrade to rebuild or apply the system catalog changes. Such code would need to replicate the similar concept in the reverse direction to support downgrade. With N candidate downgrade candidates, such logic can get even more complicated.

But in the embodiment shown in FIG. 5C, this complexity is avoided. The depicted approach allows database software 110 to be rolled back to an older version in a few hours, as compared to a multi-day process in which the issue is fixed and upgraded to a new version with the fix. This approach also avoids building complicated migration logic. Furthermore, a downgrade may be performed even if the database server is not running or is in a crash loop. As long as the older binary is downgrade-compatible with the current state of the database, the database instance can be rebooted with an older binary and the database catalog content migrated to the shadow catalog as described above. Additionally, this approach works whether the target release version of the software is a newer version or an older version of the database software. In other words, the logic operates the same way regardless of whether the database software is being upgraded or downgraded, advantageously avoiding the need for additional code (and complexity).

Example Methods

Figure 6A:
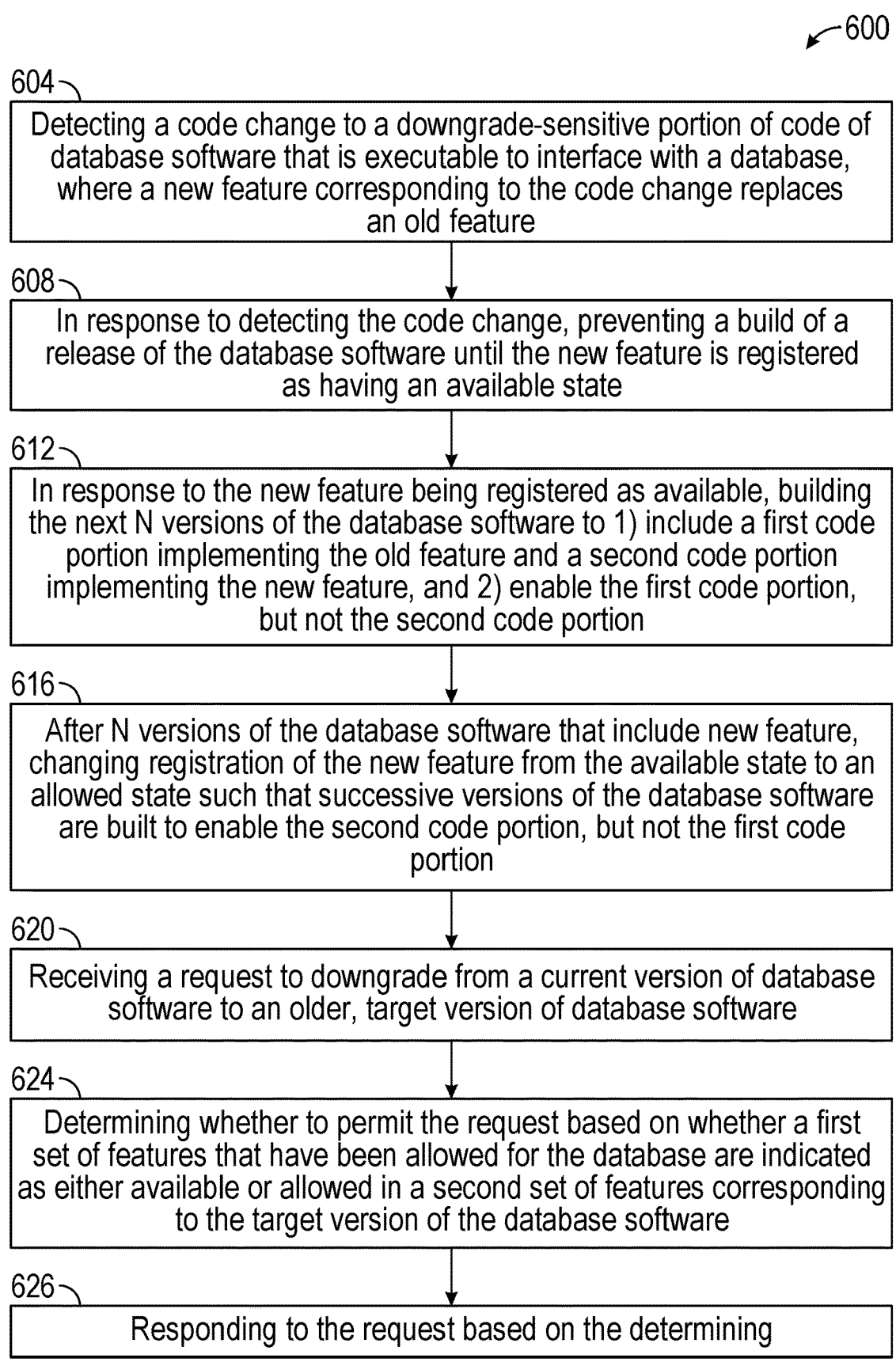
FIG. 6A is flow diagram of one embodiment of a method for building and deploying database software.

FIG. 6A is a flow diagram of one embodiment of a method 600 for deploying and downgrading database software. Method 600 may be performed for example by one or computers implementing an enterprise software deployment environment. Method 600 is susceptible to numerous variations, some of which are noted below.

Method 600 is a computer-implemented method that begins in 604, in which a code change to a downgrade-sensitive portion of code of database software is detected. As a result of this code change, a feature is introduced that is new relative to an old feature, or an entirely new feature not present in the prior version of the database software. As has been noted, the database software is executable to interface with a database (e.g., by performing reads, writes, caching, etc.). Detecting the code change may include detecting a difference in a checksum value associated with a protected area of the database software into which the code change is made, as described above with reference to FIG. 2.

Responsive to the detection of 604, a subsequent build of a release of the database software is prevented until the new feature is registered as having an available state in 608. In some embodiments, once a checksum difference is detected, software such as build module 320 may be written such that the build process for the new release will not complete until the existence of the new feature has been recorded in some manner (e.g., in a data store that includes version feature sets such as 314A, 314B, etc.). For example, upon the detection of a checksum difference, a build tool may display a message to a user that indicates the need to record the existence of the change. In one embodiment, the user might then manually make the change, and then the build tool can verify the change has been made (e.g., the tool might read the appropriate feature set 314 file and then verify the feature has been recorded and its status set to "available."). In other embodiments, the build tool might manually take input such as a description of the new feature, and perform the inserting into feature set 314 itself. A particular feature set 314 for a database version can be stored in any suitable location or format.

Method 600 then proceeds to 612. After the new feature is registered as available in 608, the next N versions of the database software are built. These N versions are built such that they each 1) include a first code portion implementing the old feature and a second code portion implementing the new feature; and 2) enable the first code portion, but not the second code portion.

In 616, after N versions of the database software that include new feature have been built, registration of the new feature is changed from the available state to an allowed state. This may be performed, for example, along with the N+1-th build that includes the new features. These builds are performed such that successive versions of the database software have the second code portion, but not the first code portion, enabled.

In 620, a request to downgrade from a current version of database software to an older, target version of database software is received. Next, in 624, it is determined whether to permit the request. This determination is based on whether a first set of features that have been allowed for the database are indicated as either available or allowed in a second set of features corresponding to the target version of the database software. The determining of 624 may prevent use of the new feature in the database software until after N releases in which the new feature is available but is not yet allowed to make changes to the database. This step thus provides a downgrade window that includes N versions of the database software to which to downgrade at a given point in time with respect to the new feature.

Finally, method 600 concludes in 626 by responding to the request based on the determining. Responding to the request may include initiating a downgrade in response to determining that all of the first set of features are included in the second set of features. Conversely, if one or more of the first set of features are not allowed or available in the second set of features, the request can be denied.

FIG. 6B is a flow diagram of one embodiment of a method for performing a downgradability test. Method 650, in some cases, may be performed as a portion of method 600. In some cases, method 650 may be performed by a computer system within an enterprise software deployment environment.

Method 650 begins in 660, with the receipt of a request to downgrade from a current version of database software to an older, target version of database software that is executable to interface with a database. In some cases, the request may include a version or release identification of the target version. This downgrade request is commonly made in response to the discovery of an error in a current version of the database software.

Next, method 600 includes performing, in 670, a downgradability test that determines whether the target version of the database software is compatible with a current state of the database. The downgradability test includes determining 1) a first set of features that have been allowed for the database and 2) a second set of features that are indicated as available or allowed in the target version of the database. The downgradability test may then determine whether the target version of the database software is compatible with a current state of the database by assessing whether all of the first set of features are included in the second set of features.

In 680, the computer system responds to the request based on a result of the downgradability test. In response to the downgradability test determining that all of the first set of features are included in the second set of features, 680 includes causing initiation of a downgrade to the target version.

In some embodiments, the downgrade is performed using a software routine that can also be used for performing an upgrade to a newer binary version of database software 110. The software (e.g., version change module 520) thus permits a transition from a first version of the database software to a second version, whether the transition is an upgrade or a downgrade. The downgrade can be performed in one embodiment by creating a shadow catalog, importing contents from a catalog of the database into the shadow catalog, and then switching over from using the current version of the database software and the catalog to access the database to using the target version of the database software and the shadow catalog to access the database.

In contrast, in response to the downgradability test determining that one or more of the first set of features is not included in the second set of features, 680 includes preventing the request to downgrade. In some embodiments, prevention of the downgrade may include display of an informative error message indicating which features are not present in the desired version. In some cases, the software that displays this error message might present a list of potential versions to which a downgrade is currently permissible; this may be performed by various comparisons of feature sets 314 and 324.

Some implementations of method 650 may include preventing use of a new feature in the database software until after N releases in which the new feature is available but is not yet enabled (i.e., allowed to make changes to the database). This approach thus provides a downgrade window of N versions of the database software to which to downgrade at a given point in time with respect to the new feature. In order to track new features, method 650 may also include initiating a change update process in response to detecting (e.g., during a build process) a difference in a checksum value associated with a protected area of the database software into which a change is made. The change update process may include amending a feature setting file to indicate that the change is in an available state. The change update process may include subsequently updating the feature setting file to indicate that the change is now allowed after N releases in which the change is included, meaning that the new feature can become a feature of database 120. (The downgradability test can thus use the feature setting file in performing its test.) Still further, in some cases, a new release of the database software is prevented from being built unless the change update process is begun.

Another version of method 650 also involves a downgradability test for database software executable to interface with a database from a current version to an older, target version. The target version of the database software may be defined to be compatible with a current state of the database in response to the target version being one of the previous N releases of the database software, where N is a defined downgrade window and is an integer greater than or equal to one.

The method may begin receiving a downgrade request. This method next includes the computer system accessing 1) a first set of features that have been allowed for the database (e.g., some aspect of the schema of the database), and 2) a second set of features that are indicated as available or allowed in the target version of the database software. The computer system can then determine whether the target version of the database software is compatible with a current state of the database based on a comparison of the first set of features to the second set of features. The computer system can conclude the alternate method by responding to the request based on the determining.

A downgrade may be initiated in response to determining that all of the first set of features are included in the second set of features. The downgrade can be performed in some cases using a software routine that permits a transition from a first version of the database software to a second version, whether the transition is an upgrade or a downgrade. Alternatively, the response can include preventing the request to downgrade in response to determining that one or more of the first set of features are not included in the second set of features.

In some cases, the target version of the database software includes a first code portion executable to access the database using an older version of the particular feature and a second code portion executable to access the database using a newer version of the particular feature. The first code portion, but not the second code portion, is enabled in the target version as default behavior with respect to the particular feature. In contrast, the current version of the database software also includes the first code portion and the second code portion, but the second code portion (instead of the first code portion) is enabled as default behavior with respect to the particular feature.

In some instances, the method may include preventing a version of the database software from being built in response to detecting that a change has been made to a downgrade-sensitive portion of code of the database software without beginning a change update process. The change update process may include a feature setting file is amended to indicate that the change is in an available state. The change update process may also include the feature setting file being later updated to indicate that the change is allowed after N releases in which the change is included.

Various techniques described herein, may be performed by one or more computer programs. The term "program" is to be construed broadly to cover a sequence of instructions in a programming language that a computing device can execute or interpret. These programs may be written in any suitable computer language, including lower-level languages such as assembly and higher-level languages such as Python.

Program instructions may be stored on a "non-transitory, computer-readable storage medium" or a "non-transitory, computer-readable medium." The storage of program instructions on such media permits execution of the program instructions by a computer system. These are broad terms intended to cover any type of computer memory or storage device that is capable of storing program instructions. The term "non-transitory," as is understood, refers to a tangible medium. Note that the program instructions may be stored on the medium in various formats (source code, compiled code, etc.).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

Similarly, systems that implement the methods described with respect to any of the disclosed techniques are also contemplated. One such environment in which the disclosed techniques may operate is a cloud computer system. A cloud computer system (or cloud computing system) refers to a computer system that provides on-demand availability of computer system resources without direct management by a user. These resources can include servers, storage, databases, networking, software, analytics, etc. Users typically pay only for those cloud services that are being used, which can, in many instances, lead to reduced operating costs. Various types of cloud service models are possible. The Software as a Service (SaaS) model provides users with a complete product that is run and managed by a cloud provider. The Platform as a Service (PaaS) model allows for deployment and management of applications, without users having to manage the underlying infrastructure. The Infrastructure as a Service (IaaS) model allows more flexibility by permitting users to control access to networking features, computers (virtual or dedicated hardware), and data storage space. Cloud computer systems can run applications in various computing zones that are isolated from one another. These zones can be within a single or multiple geographic regions.

A cloud computer system includes various hardware components along with software to manage those components and provide an interface to users. These hardware components include a processor subsystem, which can include multiple processor circuits, storage, and I/O circuitry, all connected via interconnect circuitry. Cloud computer systems thus can be thought of as server computer systems with associated storage that can perform various types of applications for users as well as provide supporting services (security, load balancing, user interface, etc.).

One common component of a cloud computing system is a data center. As is understood in the art, a data center is a physical computer facility that organizations use to house their critical applications and data. A data center's design is based on a network of computing and storage resources that enable the delivery of shared applications and data.

The term "data center" is intended to cover a wide range of implementations, including traditional on-premises physical servers to virtual networks that support applications and workloads across pools of physical infrastructure and into a multi-cloud environment. In current environments, data exists and is connected across multiple data centers, the edge, and public and private clouds. A data center can frequently communicate across these multiple sites, both on-premises and in the cloud. Even the public cloud is a collection of data centers. When applications are hosted in the cloud, they are using data center resources from the cloud provider. Data centers are commonly used to support a variety of enterprise applications and activities, including, email and file sharing, productivity applications, customer relationship management (CRM), enterprise resource planning (ERP) and databases, big data, artificial intelligence, machine learning, virtual desktops, communications and collaboration services.

Data centers commonly include routers, switches, firewalls, storage systems, servers, and application delivery controllers. Because these components frequently store and manage business-critical data and applications, data center security is critical in data center design. These components operate together provide the core infrastructure for a data center: network infrastructure, storage infrastructure and computing resources. The network infrastructure connects servers (physical and virtualized), data center services, storage, and external connectivity to end-user locations. Storage systems are used to store the data that is the fuel of the data center. In contrast, applications can be considered to be the engines of a data center. Computing resources include servers that provide the processing, memory, local storage, and network connectivity that drive applications. Data centers commonly utilize additional infrastructure to support the center's hardware and software. These include power subsystems, uninterruptible power supplies (UPS), ventilation, cooling systems, fire suppression, backup generators, and connections to external networks.

Data center services are typically deployed to protect the performance and integrity of the core data center components. Data center therefore commonly use network security appliances that provide firewall and intrusion protection capabilities to safeguard the data center. Data centers also maintain application performance by providing application resiliency and availability via automatic failover and load balancing.

One standard for data center design and data center infrastructure is ANSI/TIA-942. It includes standards for ANSI/TIA-942-ready certification, which ensures compliance with one of four categories of data center tiers rated for levels of redundancy and fault tolerance. A Tier 1 (basic) data center offers limited protection against physical events. It has single-capacity components and a single, nonredundant distribution path. A Tier 2 data center offers improved protection against physical events. It has redundant-capacity components and a single, nonredundant distribution path. A Tier 3 data center protects against virtually all physical events, providing redundant-capacity components and multiple independent distribution paths. Each component can be removed or replaced without disrupting services to end users. A Tier 4 data center provides the highest levels of fault tolerance and redundancy. Redundant-capacity components and multiple independent distribution paths enable concurrent maintainability and one fault anywhere in the installation without causing downtime.

Many types of data centers and service models are available. A data center classification depends on whether it is owned by one or many organizations, how it fits (if at all) into the topology of other data centers, the technologies used for computing and storage, and its energy efficiency. There are four main types of data centers. Enterprise data centers are built, owned, and operated by companies and are optimized for their end users. In many cases, they are housed on a corporate campus. Managed services data centers are managed by a third party (or a managed services provider) on behalf of a company. The company leases the equipment and infrastructure instead of buying it. In colocation ("colo") data centers, a company rents space within a data center owned by others and located off company premises. The colocation data center hosts the infrastructure: building, cooling, bandwidth, security, etc., while the company provides and manages the components, including servers, storage, and firewalls. Cloud data centers are an off-premises form of data center in which data and applications are hosted by a cloud services provider such as AMAZON WEB SERVICES (AWS), MICROSOFT (AZURE), or IBM Cloud.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s)

of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" be used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A non-transitory, computer-readable hardware storage medium storing program instructions that are capable of being executed on a computer system to perform operations that comprise:
    receiving a request to perform a downgrade from a current version of database software to an older, target version of the database software, wherein the database software is executable to interface with a database;
    performing a downgradability test that includes:
        determining a first set of features that have been allowed for the database;
        determining a second set of features that are indicated as available or allowed in the target version of the database software; and
        determining whether the target version of the database software is compatible with a current state of the database by assessing whether all of the first set of features are included in the second set of features;
    responding to the request based on a result of the downgradability test by initiating the downgrade of the current version of the database software or denying the request to perform the downgrade of the current version of the database software; and
    preventing use of a new feature in the database software until after N releases in which the new feature is available but is not yet allowed to make changes to the database, thus providing a downgrade window that includes N versions of the database software to which to downgrade at a given point in time with respect to the new feature.

2. The non-transitory, computer-readable hardware storage medium of claim 1, wherein initiating the downgrade of the current version of the database software is performed in response to the downgradability test determining that all of the first set of features are included in the second set of features; and wherein denying the request to perform the downgrade of the current version of the database software is performed in response to the downgradability test determining that one or more of the first set of features are not included in the second set of features.

3. The non-transitory, computer-readable hardware storage medium of claim 2, wherein the downgrade of the current version of the database software is performed using a software routine that permits a transition from a first version of the database software to a second version of the database software, whether the transition is an upgrade or a downgrade.

4. The non-transitory, computer-readable hardware storage medium of claim 2, wherein the downgrade of the current version of the database software is performed by:
    creating a shadow catalog;
    importing contents from a catalog of the database into the shadow catalog; and
    switching over from 1) using the current version of the database software and the catalog of the database to access the database to 2) using the target version of the database software and the shadow catalog to access the database.

5. The non-transitory, computer-readable hardware storage medium of claim 1, wherein the operations further comprise:
    in response to detecting a difference in a checksum value associated with a protected area of the database software into which a change is made, initiating a change update process in which:
        a feature setting file is amended to indicate that the change is in an available state; and
        the feature setting file is later updated to indicate that the change is allowed after N releases in which the change is included.

6. The non-transitory, computer-readable hardware storage medium of claim 5, wherein a new release of the database software is prevented from being built unless the change update process is begun, and wherein the downgradability test checks the feature setting file in order to determine the second set of features.

7. A method for determining whether to permit downgrading of database software, the method comprising:
    receiving, by a computer system, a request to perform a downgrade from a current version of database software to an older, target version of the database software, wherein the database software is executable to interface with a database;
    accessing, by the computer system:
        a first set of features that have been allowed for the database; and
        a second set of features that are indicated as available or allowed in the target version of the database software;
    determining, by the computer system, whether the target version of the database software is compatible with a current state of the database based on a comparison of the first set of features to the second set of features; and
    responding, by the computer system, to the request based on the determining by initiating the downgrade of the current version of the database software or denying the request to perform the downgrade of the current version of the database software; and
    wherein the target version of the database software is defined to be compatible with the current state of the database in response to the target version of the database software being one of N previous releases of the database software, and wherein N is a defined downgrade window.

8. The method of claim 7, wherein the first set of features includes a particular feature relating to a schema of the database.

9. The method of claim 8, wherein the target version of the database software includes a first code portion executable to access the database using an older version of the particular feature and a second code portion executable to access the database using a newer version of the particular feature, and wherein the first code portion, but not the second code portion, is enabled in the target version of the database software as default behavior with respect to the particular feature.

10. The method of claim 9, wherein the current version of the database software includes the first code portion and the second code portion, and wherein the second code portion, but not the first code portion, is enabled in the current version of the database software as default behavior with respect to the particular feature; and wherein the target version of the database software is downgrade-compatible with the current state of the database with respect to the particular feature.

11. The method of claim 7, wherein responding to the request includes:

initiating the downgrade of the current version of the database software in response to determining that all of the first set of features are included in the second set of features.

12. The method of claim 11, wherein the downgrade of the current version of the database software is performed using a software routine that permits a transition from a first version of the database software to a second version of the database software, whether the transition is an upgrade or a downgrade.

13. The method of claim 7, wherein denying the request to perform the downgrade of the current version of the database software is performed in response to determining that one or more of the first set of features are not included in the second set of features.

14. The method of claim 7, further comprising:

preventing a version of the database software from being built in response to detecting that a change has been made to a downgrade-sensitive portion of code of the database software without beginning a change update process in which:
   a feature setting file is amended to indicate that the change is in an available state; and
   the feature setting file is later updated to indicate that the change is allowed after N releases in which the change is included.

15. A computer-implemented method, comprising:
detecting a code change to a downgrade-sensitive portion of code of database software that is executable to interface with a database, wherein a new feature corresponding to the code change replaces an old feature;
in response to detecting the code change, preventing a build of a release of the database software until the new feature is registered as having an available state;
in response to the new feature being registered as available, building the next N versions of the database software to:
   include a first code portion implementing the old feature and a second code portion implementing the new feature; and
   enable the first code portion, but not the second code portion;
after the next N versions of the database software include the new feature, changing registration of the new feature from the available state to an allowed state such that successive versions of the database software are built to enable the second code portion, but not the first code portion;

receiving a request to perform a downgrade from a current version of the database software to an older, target version of the database software;
determining whether to permit the request based on whether a first set of features that have been allowed for the database are indicated as either available or allowed in a second set of features corresponding to the target version of the database software; and
responding to the request based on the determining by initiating the downgrade of the current version of the database software or denying the request to perform the downgrade of the current version of the database software.

16. The computer-implemented method of claim 15, wherein detecting the code change includes detecting a difference in a checksum value associated with a protected area of the database software into which the code change is made.

17. The computer-implemented method of claim 15, wherein responding to the request includes initiating the downgrade of the current version of the database software in response to determining that all of the first set of features are included in the second set of features.

18. The computer-implemented method of claim 15, wherein the determining prevents use of the new feature in the database software until after N releases in which the new feature is available but is not yet allowed to make changes to the database, thus providing a downgrade window that includes N versions of the database software to which to downgrade at a given point in time with respect to the new feature.

19. A method for determining whether to permit downgrading of database software, the method comprising:
receiving, by a computer system, a request to perform a downgrade from a current version of database software to an older, target version of the database software, wherein the database software is executable to interface with a database;
accessing, by the computer system:
   a first set of features that have been allowed for the database, wherein the first set of features includes a particular feature relating to a schema of the database; and
   a second set of features that are indicated as available or allowed in the target version of the database software;
determining, by the computer system, whether the target version of the database software is compatible with a current state of the database based on a comparison of the first set of features to the second set of features; and
responding, by the computer system, to the request based on the determining by initiating the downgrade of the current version of the database software or denying the request to perform the downgrade of the current version of the database software; and
wherein the target version of the database software includes a first code portion executable to access the database using an older version of the particular feature and a second code portion executable to access the database using a newer version of the particular feature, and wherein the first code portion, but not the second code portion, is enabled in the target version of the database software as default behavior with respect to the particular feature.

20. A non-transitory, computer-readable hardware storage medium storing program instructions that are capable of being executed on a computer system to perform operations that comprise:
- receiving a request to perform a downgrade from a current version of database software to an older, target version of the database software, wherein the database software is executable to interface with a database;
- performing a downgradability test that includes:
  - determining a first set of features that have been allowed for the database;
  - determining a second set of features that are indicated as available or allowed in the target version of the database software; and
  - determining whether the target version of the database software is compatible with a current state of the database by assessing whether all of the first set of features are included in the second set of features;
- responding to the request based on a result of the downgradability test by initiating the downgrade of the current version of the database software or denying the request to perform the downgrade of the current version of the database software; and
- in response to detecting a difference in a checksum value associated with a protected area of the database software into which a change is made, initiating a change update process in which:
  - a feature setting file is amended to indicate that the change is in an available state; and
  - the feature setting file is later updated to indicate that the change is allowed after N releases in which the change is included.

\* \* \* \* \*